(12) United States Patent
Kuo

(10) Patent No.: US 7,576,450 B2
(45) Date of Patent: Aug. 18, 2009

(54) REGULATED ALTERNATING CURRENT POWER SUPPLY

(75) Inventor: Heng-Chen Kuo, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 49 days.

(21) Appl. No.: 11/959,474

(22) Filed: Dec. 19, 2007

(65) Prior Publication Data

US 2009/0134706 A1    May 28, 2009

(30) Foreign Application Priority Data

Nov. 27, 2007    (CN) .................. 2007 1 0202715

(51) Int. Cl.
*H01H 31/10* (2006.01)
(52) U.S. Cl. ..................................... 307/115
(58) Field of Classification Search .................. 307/115
See application file for complete search history.

(56) References Cited

U.S. PATENT DOCUMENTS 3,668,512 A * 6/1972 Carey et al. ............... 323/301

\* cited by examiner

*Primary Examiner*—Robert L. Deberadinis
(74) *Attorney, Agent, or Firm*—Frank R. Niranjan

(57) ABSTRACT

An exemplary regulated AC power supply comprising a three phase AC power source; a first switch having two input terminals arranged for receiving a first phase and a second phase of the three phase AC power source respectively, and an output terminal selectively connected to the input terminals for outputting a voltage of the first or the second phase; and a second switch having two input terminals arranged for receiving a third phase of the three phase AC power source and connected to the output terminal of the first switch respectively, and an output terminal selectively connected to the input terminals for outputting a voltages of the third phase or the voltage outputted by the first switch, wherein the first switch outputs the voltage of the first phase when it is provided, and the second switch outputs the voltage of the third phase when the it is provided.

3 Claims, 1 Drawing Sheet

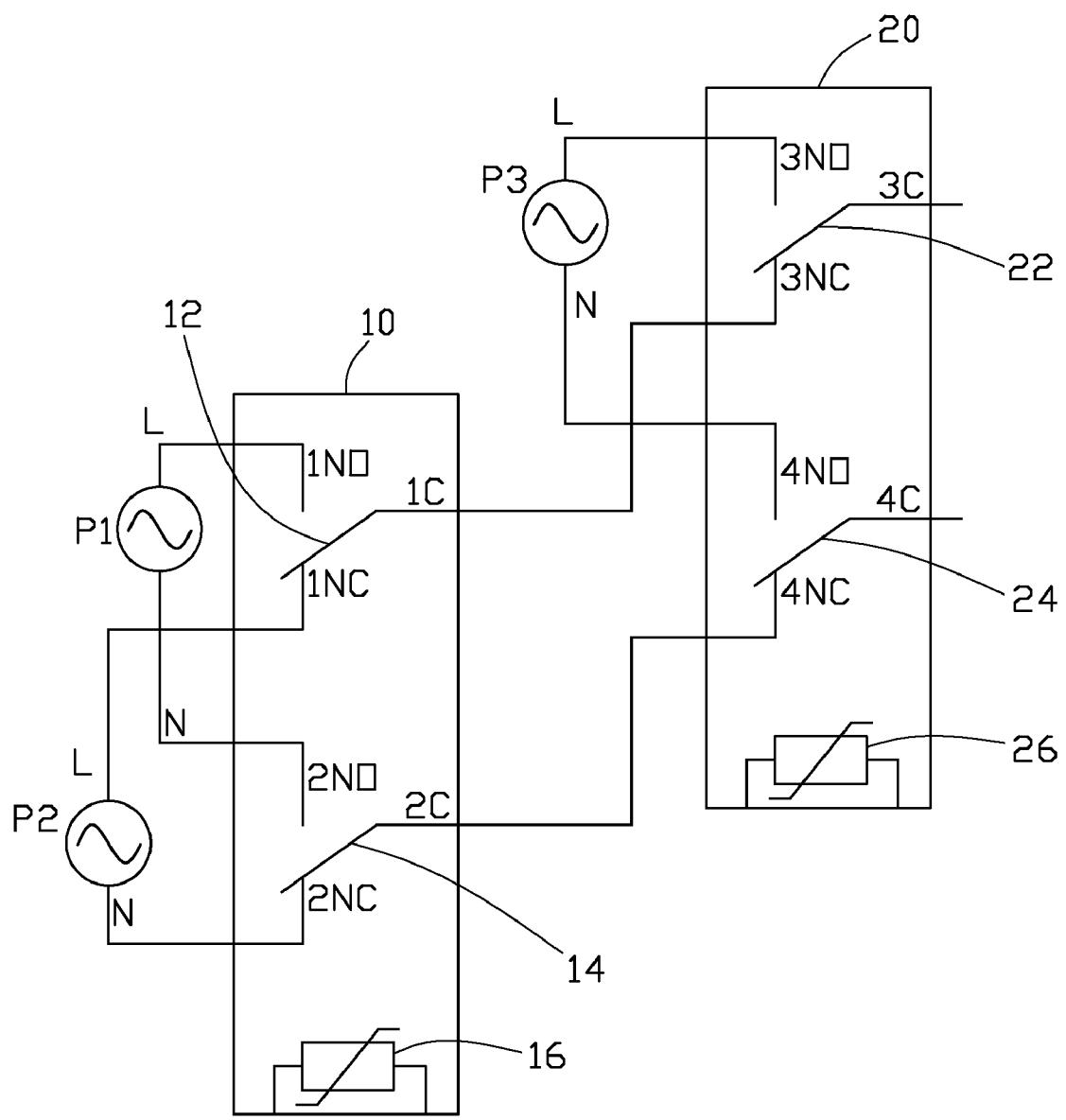

REGULATED ALTERNATING CURRENT POWER SUPPLY

BACKGROUND

1. Field of the Invention

The present invention relates to power supplies, and particularly to a regulated alternating current (AC) power supply.

2. Description of Related Art

Three phase voltage, refers to three voltages or currents that differ by a third of a cycle, or 120 electrical degrees, from each other. Three phase voltage is often used to provide AC power to electric devices. Conventionally, electric devices are susceptible to damage due to three phase AC power source faults such as power loss, phase loss, and phase reversal and often become inoperable.

SUMMARY

An exemplary regulated AC power supply comprising a three phase AC power source; a first switch having two input terminals arranged for receiving a first phase and a second phase of the three phase AC power source respectively, and an output terminal selectively connected to the input terminals for outputting a voltage of the first phase or the second phase; and a second switch having two input terminals arranged for receiving a third phase of the three phase AC power source and connected to the output terminal of the first switch respectively, and an output terminal selectively connected to the input terminals of the second switch for outputting a voltage of the third phase or the voltage output by the first switch, wherein the first switch outputs the voltage of the first phase when the first phase is provided, and the second switch outputs the voltage of the third phase when the third phase is provided.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of a regulated AC power supply in accordance with an embodiment of the present invention.

DETAILED DESCRIPTION

Referring to the drawing, a regulated alternating current (AC) power supply in accordance with an embodiment of the present invention includes a three phase AC power source having three phases P1~P3, a first relay-switch 10, and a second relay-switch 20. The first relay-switch 10 includes a first channel 12 having a pole 1C two throws 1NO and 1NC, a second channel 14 having a pole 2C and two throws 2NO and 2NC, and a relay 16. The second relay-switch 20 includes a first channel 22 having a pole 3C and two throws 3NO and 3NC, a second channel 24 having a pole 4C and two throws 4NO and 4NC, and a relay 26.

In the first relay-switch 10, the throw 1NO of the first channel 12 and the throw 2NO of the second channel 14 are connected to a live line L and a neutral line N of the phase P1 of the three phase AC power source respectively. The throw 1NC of the first channel 12 and the throw 2NC of the second channel 14 are connected to a live line L and a neutral line N of the phase P2 of the three phase AC power source respectively. The relay 16 of the first relay-switch 10 is controlled by the phase P1 of the three phase AC power source. That is, when the phase P1 is provided, the poles 1C and 2C are connected to the throws 1NO and 2NO respectively to output the voltage of phase P1, and when the phase P1 is lost and the phase P2 is provided, the poles 1C and 2C are connected to the throws 1NC and 2NC respectively to output a voltage of phase P2.

In the second relay-switch 20, the throw 3NO of the first channel 22 and the throw 4NO of the second channel 24 are connected to a live line L and a neutral line N of the phase P3 of the three phase AC power source respectively. The throw 3NC of the first channel 22 and the throw 4NC of the second channel 24 are connected to the poles 1C and 2C of the first relay-switch 10. The relay 26 of the second relay-switch 20 is controlled by the phase P3 of the three phase AC power source. That is, when the phase P3 is provided, the poles 3C and 4C are connected to the throws 3NO and 4NO respectively to output the voltage of phase P3, and when the phase P3 is lost, the poles 3C and 4C are connected to the throws 3NC and 4NC respectively to output the voltage output by the first relay-switch 10.

Therefore, the regulated AC power supply selectively provides the voltage of one of the three phases P1~P3 of the three phase AC power source which is provided by the poles 3C and 4C of the second relay-switch 20. The regulated AC power supply has good stability and reliability.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An regulated alternating current (AC) power supply comprising:

a three phase AC power source;

a first switch having two input terminals arranged for receiving a first phase and a second phase of the three phase AC power source respectively, and an output terminal selectively connected to the input terminals for outputting a voltage of the first phase or the second phase; and a second switch having two input terminals arranged for receiving a third phase of the three phase AC power source and connected to the output terminal of the first switch respectively, and an output terminal selectively connected to the input terminals of the second switch for outputting a voltages of the third phase or the voltage outputted by the first switch, wherein the first switch outputs the voltage of the first phase when the first phase is provided, and the second switch outputs the voltage of the third phase when the third phase is provided.

2. The regulated alternating current power supply as claimed in claim 1, wherein the first switch is a relay-switch comprising:

a first channel having a pole and two throws connected to live lines of the first and the second phases of the three phase AC power source respectively;

a second channel having a pole and two throws connected to neutral lines of the first and the second phases of the three phase AC power source respectively; and a relay controlled by the first phase of the three phase AC power source, wherein the poles of the first and second channels are connected to the throws of the first and second channels which are connected to the first phase of the three phase AC power source respectively for outputting the voltage of the first phase, when the first phase is provided.

3. The regulated alternating current power supply as claimed in claim 2, wherein the second switch is a relay-switch comprising:

a first channel having a pole and two throws connected to live lines of the third phase of the three phase AC power source and the pole of the first channel of the first relay-switch respectively;

a second channel having a pole and two throws connected to neutral lines of the third phase of the three phase AC power source and the pole of the second channel of the first relay-switch respectively; and a relay controlled by the third phase of the three phase AC power source, wherein the poles of the first and second channels of the second relay-switch are connected to the throws of the first and second channels of the second relay-switch which are connected to the third phase of the three phase AC power source respectively for outputting the voltage of the third phase, when the third phase is provided.

* * * * *